United States Patent [19]

Key

[11] Patent Number: 5,272,814

[45] Date of Patent: Dec. 28, 1993

[54] DEVICE FOR DEFINING A HORIZONTAL PLANE

[76] Inventor: Bruce G. Key, 20 Lavender Street, Wodonga, Victoria 3690, Australia

[21] Appl. No.: 768,967

[22] PCT Filed: Apr. 12, 1990

[86] PCT No.: PCT/AU90/00141

§ 371 Date: Oct. 8, 1991

§ 102(e) Date: Oct. 8, 1991

[87] PCT Pub. No.: WO90/13002

PCT Pub. Date: Nov. 1, 1991

[30] Foreign Application Priority Data

Apr. 14, 1989 [AU] Australia ............... PJ3677
Jan. 15, 1990 [AU] Australia ............... PJ8196

[51] Int. Cl.⁵ .............. G01B 11/26; G01C 5/00
[52] U.S. Cl. .......................... 33/290; 33/286; 33/294; 33/295; 356/138
[58] Field of Search ............... 33/1 T, 286, 290, 291, 33/293, 294, 295, 297, 298, DIG. 21, 227, 228; 356/255, 253, 138

[56] References Cited

U.S. PATENT DOCUMENTS

| | | |
|---|---|---|
| 1,922,791 | 3/1933 | Bumpus . |
| 2,959,088 | 11/1960 | Räntsch ............... 33/290 |
| 3,002,419 | 1/1961 | Vyce . |
| 3,059,520 | 4/1962 | Tsubokawa . |
| 3,170,239 | 2/1965 | Cotton ............... 33/294 |
| 4,400,888 | 7/1983 | Ström ............... 33/295 |
| 4,681,438 | 11/1987 | Kaneko ............... 356/143 |
| 5,084,980 | 2/1992 | Skopec et al. ............... 33/286 |
| 5,131,744 | 7/1992 | Kaneko et al. ............... 356/138 |

*Primary Examiner*—William A. Cuchlinski, Jr.
*Assistant Examiner*—C. W. Fulton
*Attorney, Agent, or Firm*—Walter C. Farley

[57] ABSTRACT

A device for defining a plane to determine relative elevations comprising in combination a stationary housing (7) having an aperture (8) and locating a pair of vertical reflecting surfaces (6) at right angles to each other which may be a pair of mirrors (5) or a right angle prism (32) and a levelling rod or staff (14) adapted to be positioned at a vewing distance from the housing (7) and incorporating a light source (12) and an eyepiece (15) whereby an observer at the location of the levelling rod (14) can move the light source (12) up and down the levelling rod (14) until a reflection of the light from the light source (12) is seen in the pair of reflecting sufaces (6). A reading can then be taken on the levelling rod (14) at a point midway between the eyepiece (15) and the light source (12) which defines a horizontal line from the reflecting surfaces (6).

14 Claims, 6 Drawing Sheets

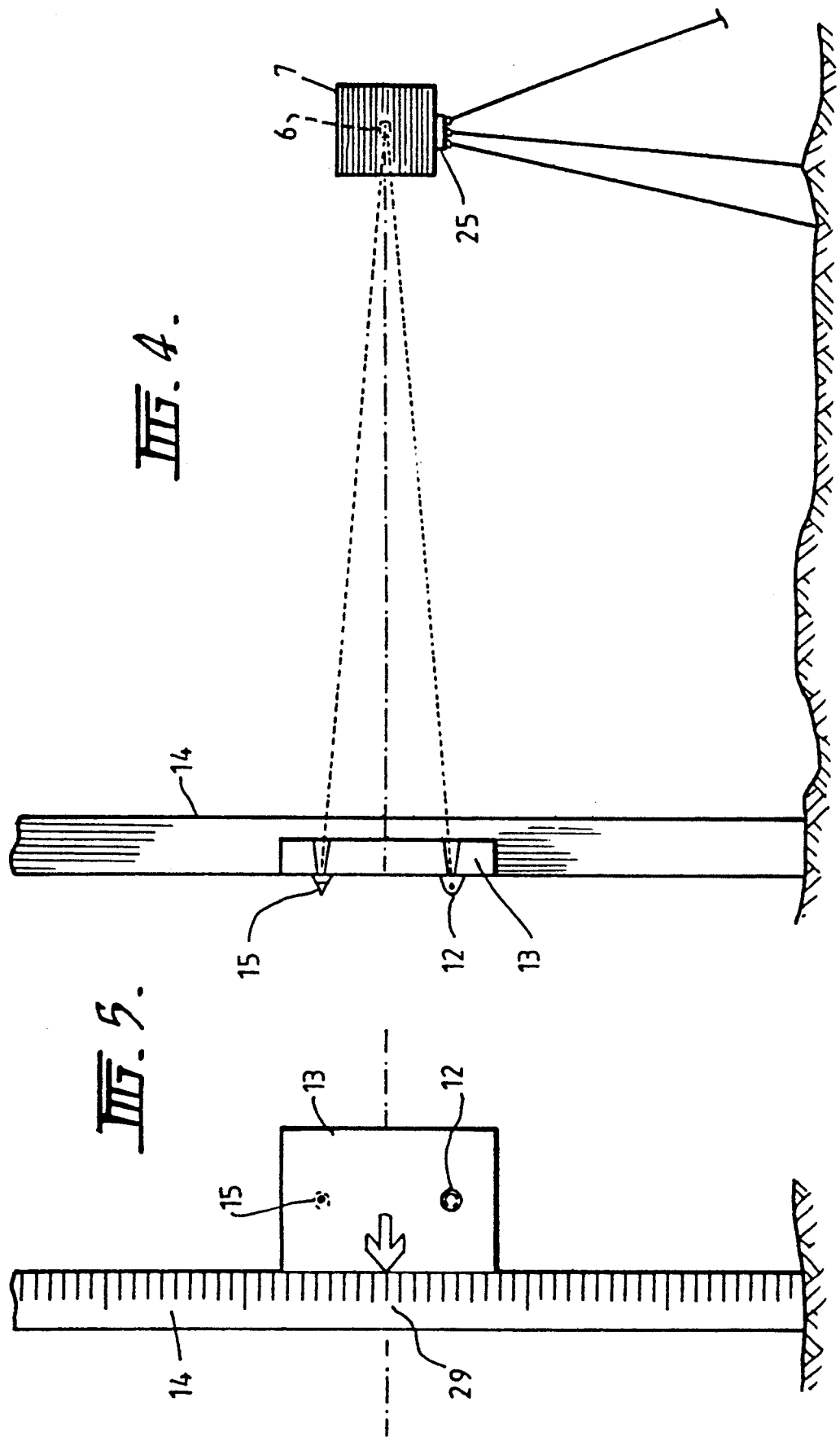

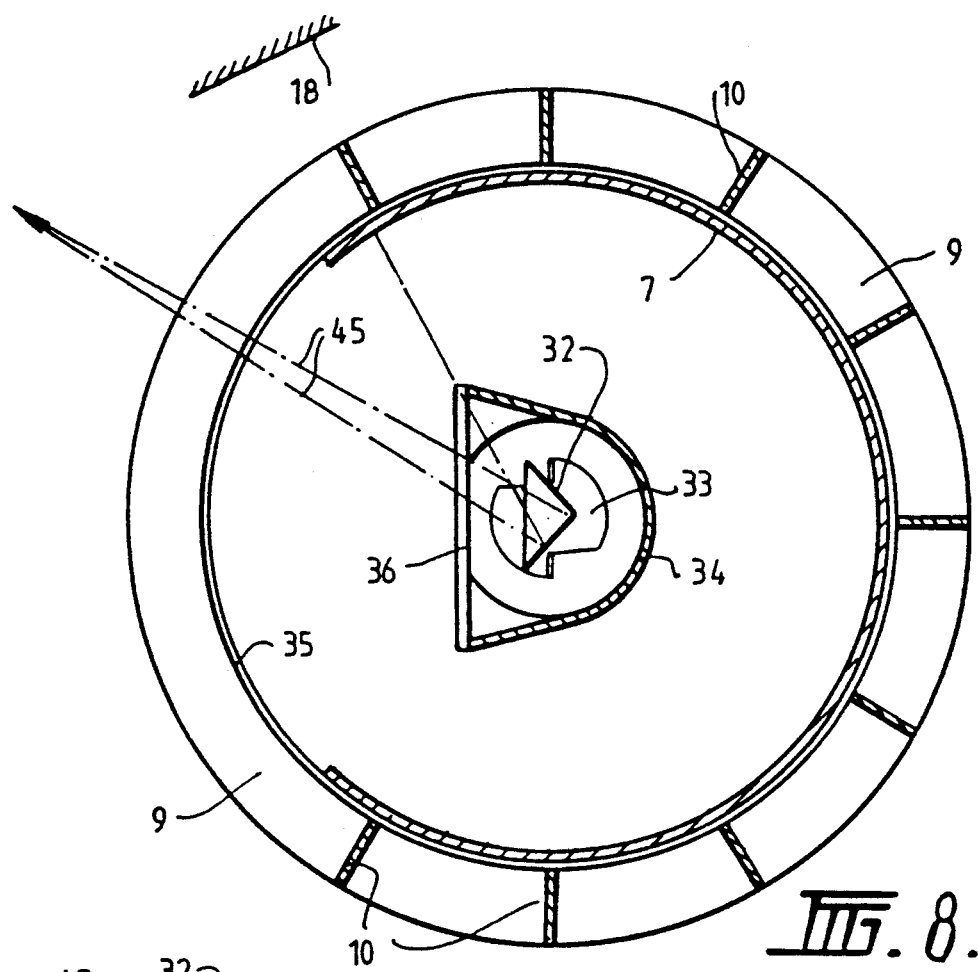
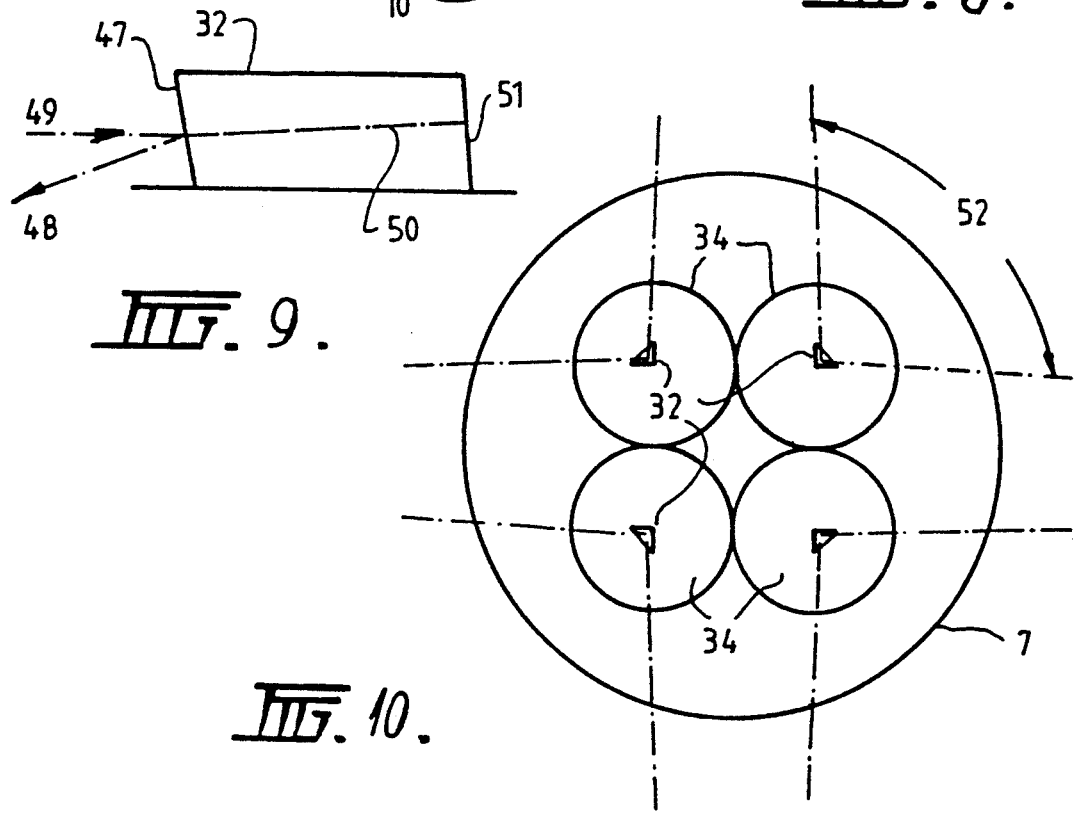

DEVICE FOR DEFINING A HORIZONTAL PLANE

FIELD OF THE INVENTION

This invention relates to a device for defining a plane, in particular, but not exclusively, a horizontal plane, such as would be required in civil engineering construction work.

BACKGROUND OF THE INVENTION

The need to find the relative elevations of points is extremely common, especially in construction work. This need is usually met by using a surveyor's level and levelling rod, or sometimes by a laser level and a sensor on a rod.

These methods are quite effective but in the case of a surveyor's level two people are required, one at the level and the other at the graduated levelling rod.

A laser level utilises a beam to form a horizontal plane and can be used by one person but it is quite expensive.

An object of the present invention is to provide a simple inexpensive device to enable the required elevation differences to be easily determined by one person.

The concept of the present invention is that a pair of vertical reflecting surfaces at right angles to each other, such as a pair of vertical mirrors at right angles to each other, or a right angled prism will reflect light back to its source, provided that the light source is not above or below the reflecting surfaces nor outside the field of view of approximately 90°.

If the mirrors have a horizontal mark on them, the horizontal plane containing that mark can be found by moving the observer's eye up and down until a reflection of the observer's eye coincides with the mark. This principle is already known, for instance in Australian Patent No. 539,881 (67092/81) where a telescope is used to assist in aligning the reflected image with the mark on the mirrors.

However, the device described in the abovementioned patent has a number of defects which make its use in practice difficult.

One defect is that it is often difficult to see the reflection of the observer's eye or telescope. One reason for this is that the reflected image of the observer's telescope is narrowed as the observer approaches the limit of the field of view near a vertical plane containing a mirror. The width of the reflected image of the telescope tends towards zero as this limit is approached. A second reason is that undesired reflections of adjacent walls and the like appear in the mirrors and makes it hard to see the desired reflection. This is compounded if the observer and his telescope are in subdued light and the walls or other objects are brightly illuminated.

The second problem is that it is difficult to maintain the mirrors in accurate vertical planes because uneven thermal expansion of the supporting tripod and frame upsets the vertical alignment. This is of particular concern because the observer will normally be at the levelling rod rather than the mirror device and hence may be unaware of the mis-levelment.

The present invention eliminates or greatly reduces the above problems.

Firstly, the difficulty of seeing the required reflection is reduced by using a bright light source at the observer's location. This light is positioned vertically above or below the position of the observer's eye. The observer moves his eye up and down until the reflection of the light is seen in the mirrors. The horizontal plane passing through the mirror is then halfway between the light and the observer's eye.

The advantage of using a light is that its reflection can easily be seen even if its subtends a very small angle at the observer's eye. This allows very small mirrors or a small prism to be used, each being typically 1 or 2 mm high and 10 or 20 mm wide. If the vertical aperture of the light is also small, say 2 or 4 mm, then it is possible to resolve elevation differences of a millimeter or so which is ample for most construction work.

Being able to use small mirrors or a small prism is not only economical but it also facilitates using an automatic levelling device to maintain them in a vertical plane.

The ease with which a light can be seen is dependent on the darkness of its background.

To facilitate seeing the reflected light the mirrors may be located in a housing which is very dark in color and which has slats around it to keep direct sunlight from illuminating the exterior of the container. Each pair of slats acts to make a heavily shaded area such as an observer would see looking into the interior of a black box. The slats also help to keep the interior cool.

The overall effect is that the housing appears to the observer as an extremely dark object. The reflected light shining out from inside can thus be easily seen, even when the observer is approaching the limit of the field of view. Another function of the housing is to shield unwanted reflections of brightly lit adjacent walls and the like which may be mistaken for the desired reflection or the light at the observer's location. A further precaution which may be taken to enable the reflection of the light easy to see is to provide a dark colored area immediately surrounding the light source and facing the mirrors.

The second problem to be overcome is to maintain the mirrors in accurate vertical planes regardless of thermal expansion over time.

In an embodiment of the present invention this is achieved by attaching the mirrors to a pendulum which has a damping arrangement to bring it to rest within a reasonable time.

The pendulum may be suspended by a system of threads, tapes or the like designed to allow it to oscillate freely in any direction without rotating.

The third problem with the device in the above-mentioned patent is that the eye of the observer has to be at the same elevation as the levelling device and that this may not be convenient on a sloping site. This difficulty is overcome in an embodiment of the present invention by the following means.

Instead of the observer being required to move his eye up and down the levelling rod to find the reflection of the light and hence the desired horizontal plane, he can keep his eye at the convenient height and move the light source up and down the rod until a reflection of it is seen at the mirror device.

The principle underlying this is that when the light and the eye are separated vertically, the horizontal plan passing through the mirrors and perpendicular to them is always half way between the light and the observer's eye. The reading on the levelling rod corresponding to the half-way point can be read directly using a special scale for this purpose.

SUMMARY OF THE INVENTION

According to the invention there is provided a device for defining a plane to determine relative elevations comprising in combination a stationary apertured housing part locating a pair of vertical reflecting surfaces at right angles to each other and a levelling rod adapted to be positioned at a viewing distance from said housing part and incorporating a light source and an observation sight which allows the desired plane to be found by observing the reflection of the light in said pair of reflecting surfaces.

In order that the invention and its manner of performance may be more fully understood, reference will now be made to embodiments of the invention as illustrated in the accompanying drawings.

DESCRIPTION OF THE DRAWINGS

FIG. 4 is a side elevation illustrating the mode of operation of the invention;

FIG. 5 is an end elevation of the levelling rod of FIG. 4 looking towards the mirror housing;

FIG. 8 is a part-sectional plan view taken along the line 8—8 of FIG. 7;

FIG. 9 is a side elevation of the prism of the embodiment of FIGS. 7 and 8 taken through its axis of symmetry; and FIG. 10 is a diagrammatic plan view of a mirror or prism housing with a field of view of 360°.

DESCRIPTION OF THE PREFERRED EMBODIMENTS

Figure 1:
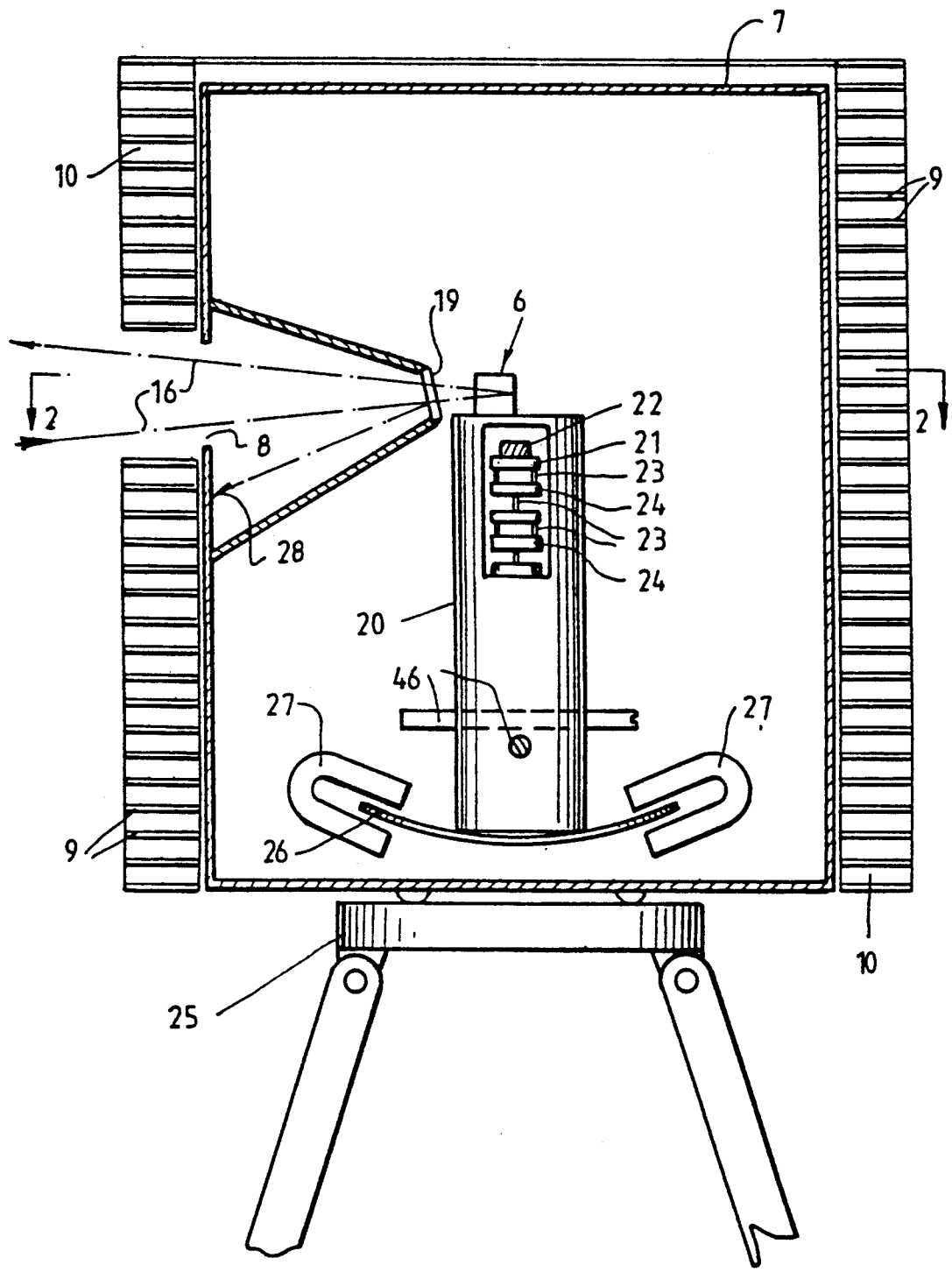
FIG. 1 is a part-sectional side elevation of a mirror housing of an embodiment of the invention.

Referring to FIGS. 1 to 6 of the drawings which illustrate an embodiment of the invention utilizing a right angle pair of mirrors 5 as the reflecting surfaces. The mirrors 5 are referred to hereafter as the mirror pair 6. The mirror pair 6 is mounted in a housing or container 7 which is preferably, but not exclusively, of circular configuration. The housing 7 has an opening 8 which defines the field of view of approximately a right angle subtended at the intersection of the mirrors 5. Slats 9, and vertical ribs 10 are provided to shade the exterior of the housing 7 from the direct rays of the sun and hence make the housing appear to the observer as a dark object. They also serve to keep the housing cool. The slats 9 and the interior and exterior of the container are dark in color, preferably matte black.

Figure 2:
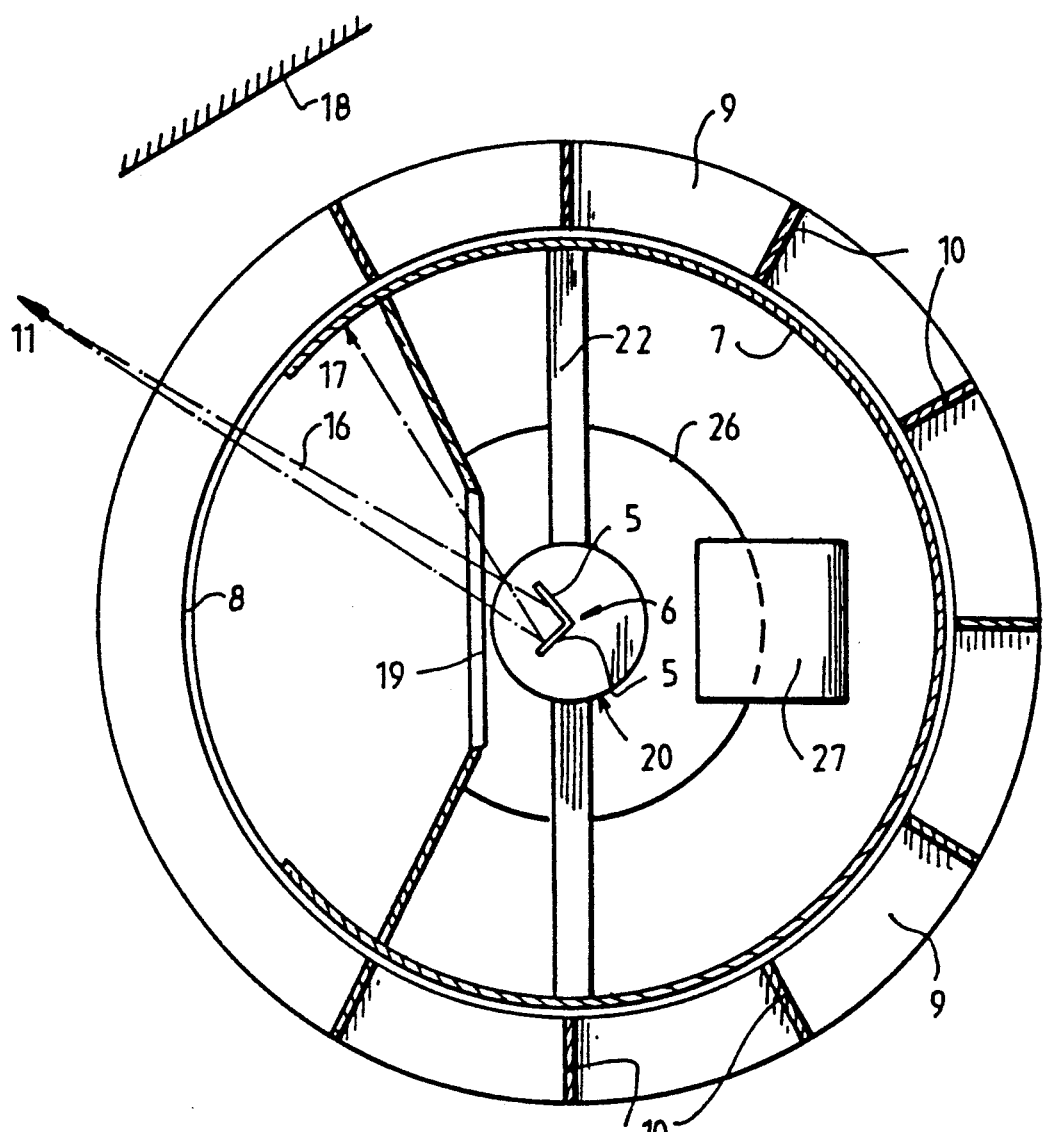
FIG. 2 is a part-sectional plan view taken along the line 2—2 of FIG. 1.
Figure 3:
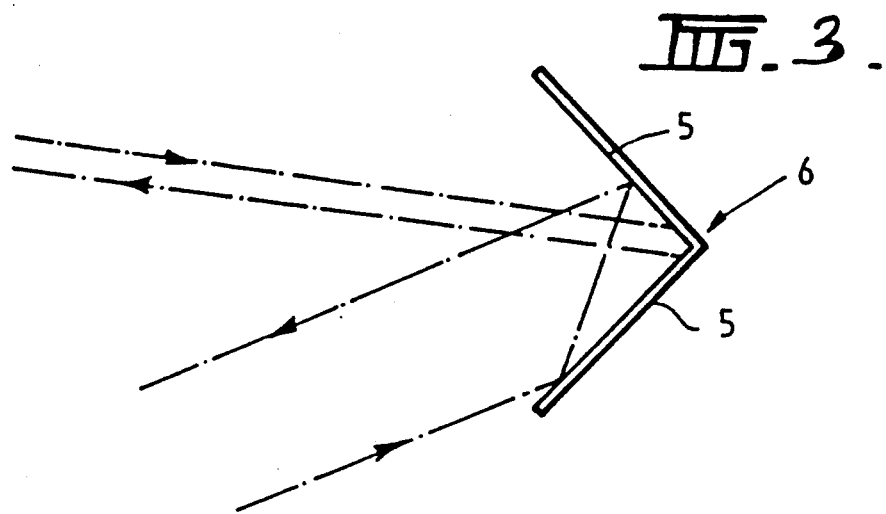
FIG. 3 is a plan view of the right-angled mirror reflecting device illustrating the reflection of light from the pair of mirrors.

In FIG. 2, the observer's eye is shown at 11 and in plan this also coincides with the light source 12 carried by a fitting 13 slidably mounted on a levelling rod 14, the light source 12 being always vertically above or below an eyepiece 15 on fitting 13. The light travels along the ray 16 and is reflected directly back into the observer's eye when the eye is at the correct elevation.

The path 17 represents a potential undesired reflection from a wall 18 which may be highly reflective. The reflection from wall 18 would confuse the observer were it not blocked out by the housing 7. Entry of wind, dust and water into housing 7 is prevented by a glass window 19.

FIG. 1 illustrates the mirror pair embodiment in elevation. The mirror pair 6 is attached to a pendulum arrangement 20. The pendulum 20 pivots at the point 21 where it is attached to a support 22 which is attached to the housing 7. The pendulum supporting system consists of groups of two or more threads 23 each attached top and bottom in turn to a plate or disc 24. Each group of threads is in a vertical plane perpendicular to the one below it. With at least two groups of threads the pendulum 20 is free to oscillate as a pendulum in any plane without rotating about its vertical axis.

Although other pivoting arrangements could be used for the pendulum, a particular advantage of the arrangement shown is that it operates effectively in any vertical plane even when the housing 7 is well off vertical. This allows the housing 7 to be mounted on the supporting tripod 25 by the operator so as to be only approximately vertical, and thus avoids the need to have a set of footscrews under the housing 7 to bring the automatic mechanism within its operating range as in other mechanisms.

Damping is required to bring the pendulum to rest in a reasonable time. This is achieved by using electro-magnetic damping. A non-magnetic metal plate 26 moving in the magnetic field of magnets 27 causes currents to flow in the plate 26 which generate a magnetic field opposing the motion of the pendulum.

The window 19 is at an angle to the vertical, tilted forwards as illustrated or rearwards to allow the undesired reflections from it to be absorbed by the interior of the container as shown at 28. The two rays 16 (FIG. 1) represent light rays travelling from the light source 12 to the observer's eye via the mirror pair 6.

In order for the pendulum 20 to come to rest with both mirrors of the mirror pair exactly vertical, it is necessary to be able to alter the center of gravity of the pendulum. This is achieved by two adjusting screws 46 set perpendicular to each other.

An improved advantage in using a self-levelling device in contrast to spirit levels as shown in the prior art patent referred to above is that uneven thermal expansion of the parts of the device is much less likely to tilt the mirrors away from vertical. In the present invention uneven expansion of the critical parts, being the pendulum and mirror assembly, is further reduced by having them enclosed in the housing 7.

There are two modes of operation when using this embodiment of the invention. FIG. 4 is a side elevation illustrating the usual mode of operation, and FIG. 5 is an end elevation looking towards the mirror part 6. The levelling rod 14 carries fitting 13, which can be moved up and down the rod, the fitting carrying the light source 12 and the eye piece 15, both of which may or may not be fitted with optics. The fitting 13 is moved up and down rod 14 until the observer sees a reflection of the light in the mirror pair 6. The height of the fitting is then read off the graduation 29 on the levelling rod. If the same process is repeated at the second location, the difference in elevation of the two locations is equal to the difference in the rod readings. The eyepiece could incorporate a bubble which could be seen while looking at housing 7, similar to that used on eye levels. This would immediately tell the observer whether to move the fitting up or down to find the correct level and the desired reflection.

Figure 6:
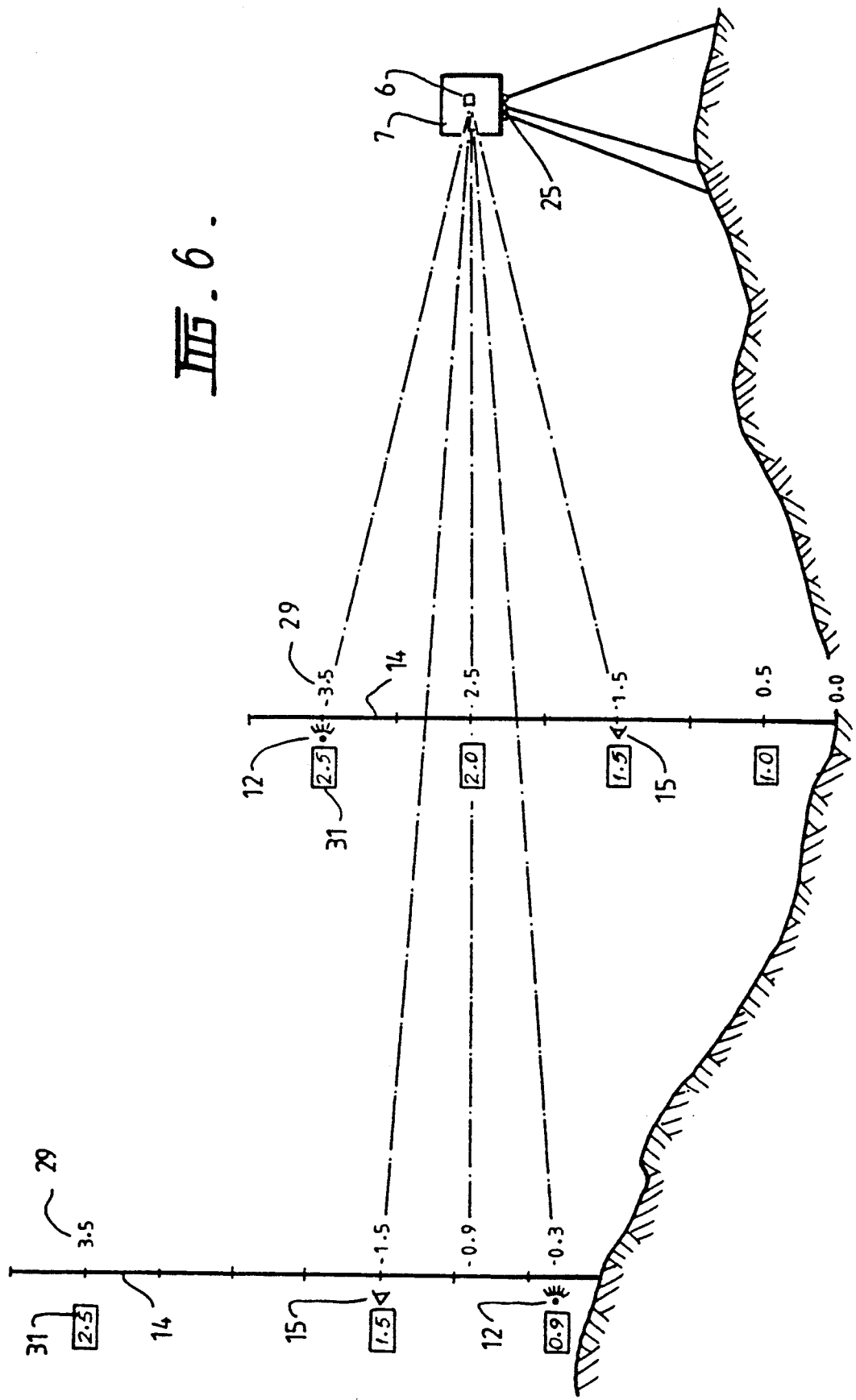
FIG. 6 is a diagrammatic elevation illustrating the use of the invention on sloping ground.

FIG. 6 illustrates the use of the invention on sloping ground which is the second mode of operation. In this case the eyepiece 15 is detached from the fitting 13, and remains at a convenient height for the observer, shown in FIG. 6 as 1.5 meters while the light moves up and down the rod. Two separate locations of the staff are shown. In each case it can be seen that the horizontal line from the mirror pair 6 lies halfway between the light source 12 and the eyepiece 15.

The upright decimal numbers 29 represent the ordinary set of graduations on the rod. The desired reading could be deduced in each case by reading the positions of the light source, and the eyepiece on these graduations and averaging them. However, this would be inconvenient. To avoid having to average two readings, an alternate set of graduation 31, is provided. These are arranged so that the reading at the eyepiece is the same on both the alternative and the normal graduations, and each meter on the alternative graduations is graduated to read as through it was half a meter, that is, the alternative graduations enlarged by a factor of two.

It is possible to determine the desired reading directly by reading the position of the light source 12 on the alternative scale. It can be seen in. FIG. 6 that the reading at the light source 12 on each rod is the same as is obtained by averaging the readings of the light and the eyepiece on the normal set of graduations.

Figure 7:
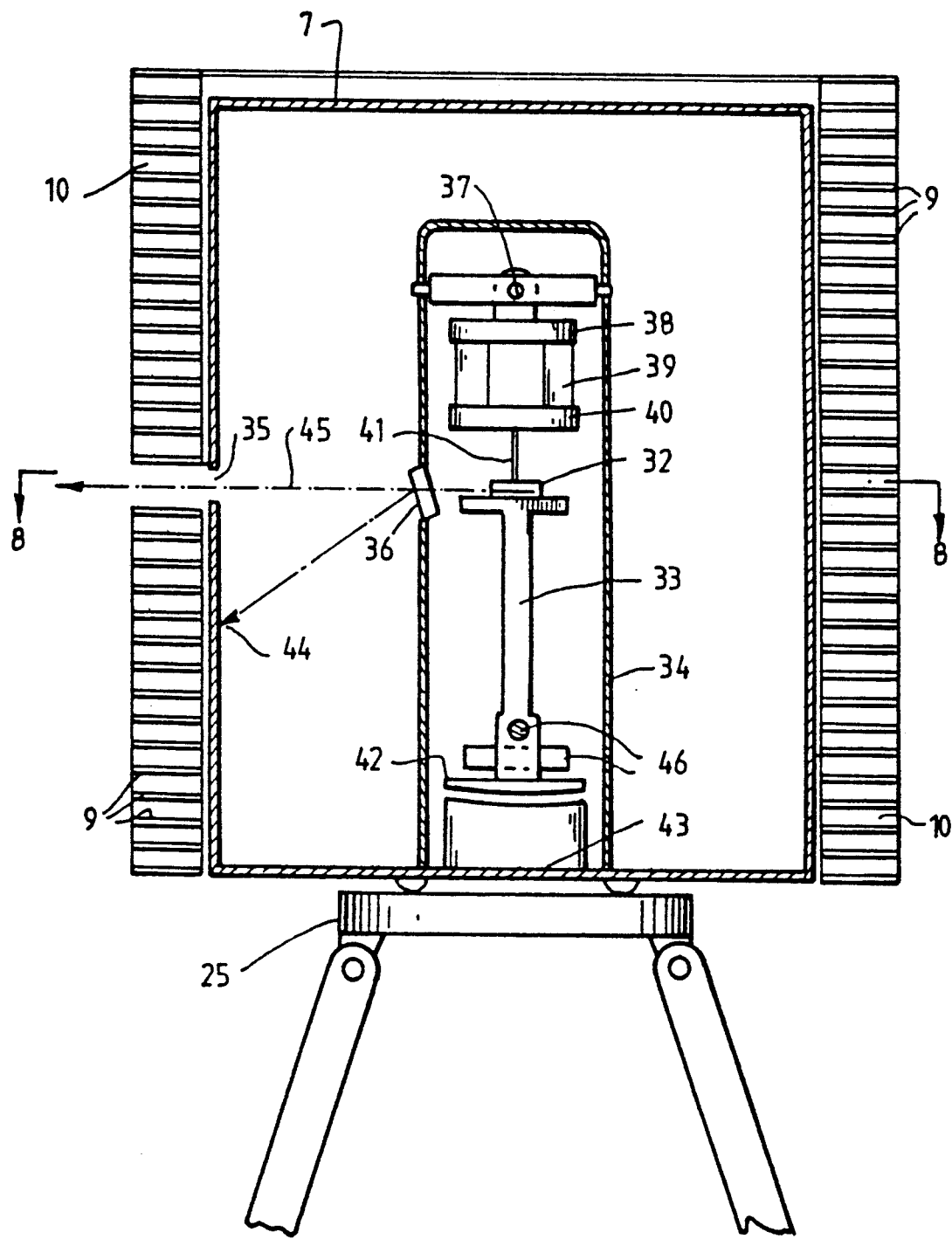
FIG. 7 is a part-sectional side elevation similar to FIG. 1 illustrating the use of a prism as the reflecting device with a modified suspension system.

FIGS. 7, 8, and 9 illustrate another embodiment of the invention wherein the light reflecting device is a right angle prism 32. Prism 32 is suitably silvered or coated to provide the right-angled reflecting surfaces.

Prism 32 is located on the upper end of a pendulum 33 suspended from the upper part of a container 34 located in the housing 7, the container 34 serving to protect prism 32 and the pendulum and its suspension from wind and dust, and the housing 7, as in the previous embodiment, has as its main function the provision of a dark background against which to see the reflection of the light source 12 and to block out undesired reflections from brightly illuminated objects such as wall 18.

The housing 7, in this embodiment, has an opening 35 and the inner container 34 has a window 36 to allow light to enter.

The pendulum 33 is suspended in container 34 from a gimbal arrangement 37 which in turn supports a disc or plate 38 from which depends flexible tapes 39. At each level, one, two or more tapes, membranes or flexible threads or wires or the like could be used provided that they all lie in the same vertical plane so as to allow the pendulum to be able to oscillate in a plane perpendicular to the plane of the tapes 39 or the like.

The tapes 39 support a disc or plate 40 from which depends another set of tapes or the like 41 which support the pendulum 33 for oscillatory movement in a plane perpendicular to the plane of the tapes 41. The pendulum 33 is thus free to oscillate as a pendulum in any plane without rotating about its vertical axis.

Although other pivoting arrangements cold be used for the pendulum, a particular advantage of the arrangement shown in FIG. 7 is that it operates effectively in any vertical plane even when the container 34 is well off vertical. This allows the housing 7, as in the previous embodiment, to be mounted on the supporting tripod 25 by the operator so as to be only approximately vertical, and thus avoids the need to have a set of footscrews under the housing 7 to bring the automatic mechanism within its operating range as in other mechanisms.

Damping is achieved by using a non-magnetic metal plate 42 moving in the magnetic field of the magnets 43 which causes currents to flow in the plate 42 which generate a magnetic field opposing the motion of the pendulum.

The window 36 is at an angle to the vertical titled forwards as illustrated or rearwards to allow the undesired reflections from it to be absorbed by the interior of the housing 7 as shown at 44. The ray 45 represents a light ray travelling from the light source 12 to the prism 32 and back towards the source.

In order for the pendulum 33 to come to rest with the mirrored surface of the prism 32 exactly vertical, it is necessary to be able to alter the center of gravity of the pendulum or alter the point of suspension or the angle between the prism and the pendulum axis. The required verticality of the mirrored surfaces is achieved by two adjusting screws 46 set perpendicular to each other, which alters the position of the center of gravity of the pendulum.

The modes of operation when using this embodiment of the invention are similar to those described in the previous embodiment.

FIG. 9 is an elevation of the prism 32 taken through its axis of symmetry. For simplicity the earlier description has been in terms of the prism having its two reflecting surfaces in perpendicular vertical planes. If mirrors are used as in the previous embodiment this assumption is correct but when a prism is used it may be necessary to eliminate undesirable reflections from the front surface 47 of the prism 32.

This is achieved by having its surface sloping down as shown (or up) by a small angle. Undesirable reflections 48 from brightly lit, objects in the field of view (such as a car windshield with the sun reflecting from it) are absorbed by the inside of the housing 7.

Because a horizontal ray 49 will be refracted as shown by ray 50 the prism needs to be tilted so that the edge 51 where the two mirrored surfaces meet is perpendicular to the ray 50, and hence the planes of the mirrored surfaces are slightly off the vertical.

FIG. 10 is a plan view of an arrangement of the invention adapted to that it provides a field of view of 360° (provided that the observer is more than a few meters away from it).

The outer housing 7 of this embodiment has a number of inner containers 34 each with its own right angle pair of mirrors or prism and pendulum assembly, arranged so that the fields of view 52 overlap, provided that the observer is a few meters away.

The invention also contemplates the substitution of a source of electromagnetic radiation, for example infrared radiation, for the light source. This would allow the use of a sensor to detect the beam instead of using the eye, which would be advantageous in some circumstances.

Claim:

1. A device for defining a plane to determine relative elevations comprising in combination a stationary apertured housing part locating a pair of vertical reflecting surfaces at right angles to each other and a levelling rod adapted to be positioned at a viewing distance from said housing part and incorporating a light source and an observation sight which allows the desired plane to be found by observing the reflection of the light in said pair of reflecting surfaces.

2. A device according to claim 1 wherein said light source and said observation sight are mounted on a fitting slidable on said levelling rod.

3. A device according to claim 1 wherein said light source is mounted on a fitting slidable on said levelling rod and said observation sight is located at a fixed position on said levelling rod.

4. A device according to claim 3 wherein said pair of reflecting surfaces comprise a pair of mirrors joined at right angles to each other.

5. A device according to claim 3 wherein said pair of reflecting surfaces comprise a right angle prism suitable coated to provide two reflecting surfaces at right angles to each other.

6. A device according to claim 1 wherein said observation sight comprises an eyepiece.

7. A device according to claim 1 wherein said front surface and said rear reflecting surfaces are mounted on a self-levelling pendulum within said housing part.

8. A device according to claim 7 wherein the pendulum is supported within the housing part by a system of two or more groups of tapes or threads attached between discs wherein each group is located on said discs in a vertical plane perpendicular to the adjacent group.

9. A device according to claim 7 and including electromagnetic damping means located in said housing part below said pendulum.

10. A device according to claim 1 wherein the plane to be defined is a horizontal plane.

11. A device according to claim 1 wherein said pair of reflecting surfaces comprises a pair of mirrors joined at right angles to each other.

12. A device according to claim 1 wherein said pair of reflecting surfaces comprises a coated right-angle prism to provide two reflecting surfaces at right angles to each other.

13. A device for defining a desired plane to determine relative elevations comprising in combination
   a stationary apertured housing part;
   a right-angled prism supported in said housing part and having
      a front surface tilted from the vertical so as to eliminate undesirable reflections from said front surface, and
      a pair of coated rear reflecting surfaces at right angles to each other which are tilted slightly from the vertical by an amount selected to compensate for refraction of a horizontal ray as it passes through the front surface of the prism and to allow a horizontal light ray entering the prism to be reflected in a horizontal direction upon leaving the prism; and
   a levelling rod adapted to be positioned at a viewing distance from said housing part and including a light source and an observation sight to allow the desired plane to be found by observing reflection of the light in said pair of reflecting surfaces.

14. A device according to claim 13 wherein said front surface and said rear reflecting surfaces are mounted on a self-levelling pendulum within said housing part.

* * * * *